United States Patent [19]

Kubota

[11] 3,882,078

[45] May 6, 1975

[54] FIBER REINFORCED POLYESTER RESIN HAVING A LOW SURFACE PROFILE AND IMPROVED IMPACT STRENGTH

[75] Inventor: Hideo Kubota, Sterling Heights, Mich.

[73] Assignee: General Motors Corporation, Detroit, Mich.

[22] Filed: Dec. 13, 1973

[21] Appl. No.: 424,574

[52] U.S. Cl............................ 260/40 R; 260/862
[51] Int. Cl............................................ C08g 51/04
[58] Field of Search......................... 260/862, 40 R

[56] References Cited
UNITED STATES PATENTS

| | | | |
|---|---|---|---|
| 2,609,353 | 9/1952 | Rubens et al. | 260/862 X |
| 3,018,266 | 1/1962 | Lundberg | 260/862 X |
| 3,231,634 | 1/1966 | Wismer et al. | 260/862 |
| 3,503,921 | 3/1970 | Souza et al. | 260/862 X |
| 3,620,900 | 11/1971 | Williger | 260/862 X |
| 3,733,370 | 5/1973 | Thompson et al. | 260/862 |
| 3,773,638 | 11/1973 | Gotok et al. | 260/862 X |

*Primary Examiner*—M. J. Welsh
*Assistant Examiner*—S. M. Person
*Attorney, Agent, or Firm*—E. W. Christen

[57] ABSTRACT

Herein is disclosed a new fiber filled polyester composition which may be used as either a bulk molding or sheet molding compound. Fiber reinforced articles molded from this composition have both a low profile surface which is suitable for decorative applications and improved impact strength. In a preferred embodiment this novel fiber filled formulation comprises an unsaturated aliphatic polyester, a block copolymer containing at least one relatively long block of an elastomeric material such as a polydiene and at least one relatively short block of a rigid thermoplastic material such as polystyrene, and a liquid monomeric crosslinking diluent. The block copolymer, which must be readily miscible in the liquid compounding mixture, contributes to both the low profile surface and the high impact strength.

4 Claims, No Drawings

FIBER REINFORCED POLYESTER RESIN HAVING A LOW SURFACE PROFILE AND IMPROVED IMPACT STRENGTH

This invention relates to new polyester resin compositions which are suitable for both sheet molding or bulk molding applications. More specifically, it relates to the utilization of a block copolymer in a fiber reinforced polyester composition; this new component contributes to both a low surface profile and a high impact strength in resultant molded articles.

For many years, articles molded from fiber reinforced, thermosetting polyester resins have been relatively inexpensive and durable. Therefore, these materials are now widely used in a variety of applications and it is recognized that they could have the potential for many more. Until recently a major drawback of using these materials in any application which required a decorative appearance was the necessity of expensive finishing operations required to smooth a very rough surface. The cause of this surface problem was the relatively large shrinkage factor of the polyester matrix during the curing operation, when compared with minimal shrinkage of the reinforcing glass fiber. The polyester matrix literally shrunk away from the glass fibers leaving them protruding from the surface.

Patents such as U.S. Pat. No. 3,701,748 issued to Kroekel in 1972, taught the technique of adding a rigid thermoplastic polymer such as cellulose acetate butyrate or an acrylic to a glass fiber filled polyester composition to achieve a smooth surface that was readily paintable and suitable for applications such as automotive exterior parts which were, and still are, desirably decorative as well as functional. Apparently, these thermoplastic additives, which have a glass transition temperature well above room temperature, function by inhibiting the shrinkage of the polyester matrix during the curing operation.

However, the full potential of the fiber reinforced polyester material could not be realized by the use of the low surface profile additive because it significantly reduced the impact strength of the cured material. Both the notched and unnotched impact strengths were reduced by almost 30%, per ASTM 256.

It is an object of my invention to provide a fiber reinforced thermosetting molded article which has a very smooth surface and improved impact strength.

It is a further object of my invention to provide a thermosetting, fiber filled polyester composition having a block copolymer of a specific type which contributes a low surface profile and improved impact strength to articles molded therefrom.

It is a further object of my invention to provide a glass fiber reinforced thermosetting polyester molded article incorporating a block copolymer which contributes a low surface profile and improved impact strength to the article.

In accordance with a preferred embodiment of my invention, these and other objects are accomplished by heating and curing under pressure a fiber filled thermosetting liquid mixture of a linear aliphatic unsaturated polyester and a suitable block copolymer, both thoroughly dispersed in a suitable monomeric reactive diluent which acts as a crosslinking agent during the curing process.

The block copolymer employed in my moldable composition is characterized by the presence of relatively long blocks of an elastomeric or flexible type material such as polydiene and shorter blocks or rigid thermoplastic units such as polystyrene. The flexible block is provided by a material which if homopolymerized would have a glass transition temperature below room temperature. The rigid block is formed of a material which if homopolymerized would have a glass transition temperature above room temperature. When incorporated in suitable quantities into my moldable composition a block copolymer so constituted contributes both improved toughness and a smoother surface to a fiber reinforced article molded therefrom.

The concentrations of the various constituents of this novel formulation may be varied considerably without significantly altering the desired properties. More specifically, it is preferred that the polyester moldable composition comprises from 25 to 60 parts by weight of the unsaturated polyester; from 5 to 20 parts by weight of the specific block copolymer; and from 40 to 60 parts by weight of the monomeric reactive diluent. In addition, this novel formulation may contain the conventional polyester molding composition additives, in their normal concentration ranges. Among others this may include from 100 parts by weight to 180 parts by weight of a mineral filler such as calcium carbonate, from 2 parts by weight to 5 parts by weight of a lubricant such as zinc stearate, from 1.0 parts by weight to 2.0 parts by weight of a crosslinking initiator such as tertiary butyl perbenzoate and from 1.0 parts by weight to 3 parts by weight of a thickener such as magnesium oxide and finally from 50 parts by weight to 100 parts by weight of a fiber filler.

The matrix component upon molding the subject compositions is the crosslinked polyester condensation reaction product of an ethylenically alpha, beta unsaturated, linear, aliphatic, dicarboxylic acid and/or anhydride having from four to six carbon atoms and linear, polyhydric alcohols. The acid number of the polyester product may vary from 5 to 40. For example, the condensation product of maleic and/or fumaric acid and polypropylene glycol has performed satisfactorily and proved to be compatible with all variations of the basic system disclosed herein.

The block copolymer is characterized by the presence of polymeric segments or blocks which, if not chemically linked into a copolymer, would be incompatible and therefore immiscible with each other in a common matrix, and would immediately separate into distinct phases. Specifically, this copolymer is constructed of relatively long blocks of elastomeric and flexible molecular units such as the polydienes and shorter blocks of rigid thermoplastic molecular units such as polystyrene.

One technique to characterize the difference between these two materials is by use of their characteristically different glass transition temperatures. The long flexible segments, if homopolymerized, would have glass transition temperatures below 10°c. and therfore have the general properties of rubbers or elastomers. On the other hand, the rigid thermoplastic materials would have glass transition temperatures above 30°C. and therefore have a relatively high modulus at room temperature.

One group of block copolymers which has performed well in this polyester application is that group having an ABA type structure with the A segment being relatively short polystyrene blocks, and B segments being much longer elastomeric segments such as polybutadiene or the random copolymer of ethylene and propylene having from 30% by weight to 75% by weight of ethylene. These materials have been termed "thermoplastic elastomers" and were the subject of an article written by Holden, Bishop and Legge, published in the *Journal of Polymer Science*, Part C at page 37 in 1969, which is herein incorporated by reference. This group of materials is now marketed by the polymers Division of the Shell Chemical Company under the trade name "Kraton," and in general, they have a molecular weight in the range of 70,000 to 120,000. However, one key to their performance in the glass filled polyester matrix appears to be the relative lengths of the elastomeric and thermoplastic blocks. These relative lengths are reflected in the weight ratio of the elastomeric (B segment) to the total of the thermoplastic (A segment) plus elastomeric (B segment) components, which should be held within a range of 0.5 to 0.8 to produce both the low surface profile and the improved impact properties in the polyester resin. Within this range there are sufficient quantities of each component to significantly improve both the surface and the impact properties of the resultant molded article.

The ordered block copolymers of the ABA type are effective in increasing the impact strength of articles molded from the subject polyester system at a concentration ranging from 4% to 24% by weight of the non-filled resin. Above this limit the additive begins to deleteriously effect other physical properties of the cured polyester system.

The monomeric reactive diluent serves two purposes in the subject moldable composition. First, it provides a liquid medium into which the various conventional fillers and other additives for polyester-based molding compositions are easily blended. Secondly, the diluent functions as a crosslinking agent during the curing process and thereby sets up the characteristic three-dimensional matrix of a thermosetting system. In performing this second function, the crosslinking monomeric diluent literally is copolymerized and therefore it must contain at least one point of ethylenic unsaturation. The most commonly used reactive diluent in prior art polyester molding compositions is styrene. Styrene is suitable for use in my molding composition, however, many others are also suitable. For example, vinyl toluene and tertiary butyl styrene and monochlorostyrene and mixtures of at least 50% tertiary butyl styrene and any of the other aforementioned diluents performed satisfactorily in this series of experiments.

In accordance with my invention tertiary butyl styrene is preferred as at least a major constituent in the monomeric crosslinking diluent for several reasons. First, the subject copolymers are readily miscible in tertiary butyl styrene and this is critical as immiscibility causes blending problems and would negate the effect of these additives on the impact strength of the subsequently molded articles. Secondly, tertiary butyl styrene shrinks very little during curing — a factor which contributes significantly to the low surface profile of the resultant molded articles, and finally, tertiary butyl styrene has several handling advantages such as a lower vapor pressure and no flash point.

An important criterion for selecting appropriate components for my molding composition is the need for a liquid "solution" during the compounding or blending operation. It is obvious to those skilled in the art that the use of the term "solution" in this context does not denote a true chemical solution but instead describes a rather homogeneous liquid dispersion which does not separate into multiple phases on a gross scale during the compounding and blending operations. If such a mixture were allowed to stand for a significant period of time, such a separation would probably occur. However, this delayed separation would be of little concern to those utilizing this system as the compounding, blending and molding operations are conventionally done within a short period of time and all that is required is a relatively homogeneous mixture during these operations.

During the blending operation, the conventional polyester molding additives may be added to the mixture. These may include a mineral filler such as calcium carbonate, a lubricant such as a zinc stearate, a crosslinking initiator such as a tertiary butyl perbenzoate and finally a thickener which raises the viscosity of the mixture to a level that can be easily processed. The utilization of the subject block copolymers in no way alters the composition compatability for these fillers and other additives at concentration normally used with conventional polyester systems.

The use of the subject block copolymer in the polyester molding composition does not preclude the addition of an independent rigid thermoplastic polymer such as poly(methyl methacrylate) and others which have been previously disclosed as low profile additives, if they are miscible in the liquid compounding mixture. Therefore, the subject molding composition may comprise a polymer composition having from 0% to 50% of a conventional low surface profile additive and from 50% to 100% of the ordered block copolymer. Fifty percent appears to be a reasonable upper limit because if the conventional surface additive constitutes much more than 50%, the impact properties of the polyester molded article are significantly reduced.

In accordance with my invention, these and other advantages will be better understood in view of the detailed description of specific examples which follow. Each example describes a different resin formulation and indicates the impact properties of articles molded from that composition. The surface finish of plaques molded from these compositions would be acceptable in most decorative applications and were essentially uniform except that articles molded from the composition described in Example VI had a slightly poorer surface finish.

From the data reported in these examples, it is evident that the presence of the block copolymer in concentrations ranging from 4% to 24% by weight of the non-filled resin definitely enhances the impact resistance of articles molded therefrom.

EXAMPLE I

Four hundred seventy-two grams of poly(dipropylene glycol fumarate-maleate) were thoroughly dispersed in 600 grams of tertiary butyl styrene. Then, 45 grams of a block copolymer having an ABA type structure was thoroughly blended into the polyester and tertiary butyl styrene mixture. The A segmentS of this block copolymer were polystyrene, and the B segments were an elastomeric random copolymer of ethylene and propylene; this block copolymer is marketed under the trade name of Kraton 0650. The elastomeric portion constitutes about 58% by weight of this copolymer.

This three component system was termed resin Z and 100 by weight were blended with the following ingredients: 169 parts by weight of calcium carbonate, 1.6 parts by weight zinc stearate, 1.3 parts by weight tertiary butyl perbenzoate and 1.5 parts by weight of a thickener magnesium oxide (MgO). This paste was then compounded with 107 parts by weight of glass fibers with an average length of 1 inch and allowed to thicken for 48 hours. After thickening, this compound was compression molded at 300°F. under 1,200 psi. The impact properties of these samples which had a 4% by weight copolymer concentration, were then evaluated according to ASTM 256. The notched impact strength was 22.0 foot pounds per inch and the unnotched impact strength was 22.5 foot pounds per inch. The samples from this formulation had a smooth surface finish which would be paintable without further finishing operations and then could be used in most decorative and functional applications.

It is noteworthy that the impact strength of articles molded from this formulation was significantly higher than that of articles molded from the conventional glass fiber reinforced resin, which has no low surface profile additive. Typically, samples molded from the standard resin have a notched impact strength of 15 foot pounds per inch and an unnotched impact strength of 20 foot pounds per inch.

Examples V thru VIII will demonstrate the deleterious effect of the previous surface additives on the impact properties of the resultant articles molded. From this data and examples I thru IV, it is evident that my novel formulation is a useful development as it contributes to both an improved surface finish and improved impact strength.

EXAMPLE II

Four hundred seventy-two grams of poly (dipropylene glycol fumarate-maleate) and 100 grams of Kraton 0650 were thoroughly dispersed in 600 grams of tertiary butyl styrene. With this as resin Z, the formulation and processing operations used in Example I were employed. The impact samples molded from this composition which contains approximately 10% by weight of Kraton 0650 had a notched impact strength of 22.5 foot pounds per inch and an unnotched impact strength of 25.0 foot pounds per inch. These samples also had a very smooth surface finish which would be applicable in most decorative uses.

EXAMPLE III

Four hundred seventy-two grams of poly (dipropylene glycol fumarate-maleate) were thoroughly dispersed in 600 grams of diluent solution containing 50% by volume tertiary butyl styrene and the balance being monochlorostyrene. In this solution, 55 grams of an ABA type block copolymer were thoroughly dispersed. The A blocks of this copolymer were polystyrene and the B blocks were polybutadiene; this material is marketed under the trade name of Kraton 1100. The elastomeric B segments constitute about 63% by weight of this material. With this mixture as resin Z, the formulation and processing operations of Example I were followed. Samples molded from this composition which contain about 5% by weight of the block copolymer had a notched impact strength of 17 foot pounds per inch and the unnotched impact strength of 20.5 foot pounds per inch. Again this specimen had a surface finish which could be acceptable in most decorative applications.

EXAMPLE IV

Four hundred seventy-two grams of poly (dipropylene glycol fumarate-isophthalate) were dissolved in 498 grams of a diluent solution of 50% by volume tertiary butyl styrene and 50% by volume monochlorostyrene. It is noteworthy that the aromatic content of the polyester must be very small. If more than 5% by weight of isophthalate acid or other aromatic acid is involved in the condensation polymerization, the resulting polyester becomes immiscible in the monomeric reactive diluent and quickly separates from the monomer and thus preventing the effective blending of the molding composition. Then 15.4 grams of cellulose acetate butyrate and 29.5 grams of an ABA block copolymer with the A segments being polystyrene and the B segments being an elastomeric random copolymer of polyethylene and polypropylene, Kraton 0650, were added to the above mixture of polyester and diluent. These last two components, the cellulose acetate butyrate and copolymer, constitute the operative system which provides the low surface profile and the high impact strength. Using the above described system as resin Z, the formulation and processing operations of Example I were followed. Samples molded from this composition had an acceptably smooth surface and a notched impact strength of 20 foot pounds per inch and an unnotched impact strength of 26 foot pounds per inch.

EXAMPLE V

Four hundred seventy-two grams of poly (dipropylene glycol fumarate-maleate) were thoroughly dispersed in 600 grams of tertiary butyl styrene and to this dispersion 45 grams of cellulose acetate butyrate were added. There was no impact additive used in this formulation and the above mixture was compounded with the conventional fillers according to the procedures described in Example I. The specimens molded from this composition had an acceptably smooth surface but the notched impact strength was only 12.0 foot pounds per inch and the unnotched was down to 16.5 foot pounds per inch. This is a significant reduction of impact resistance when compared to any of the first four examples.

EXAMPLE VI

The formulation and processing procedures as described in Example I were followed in this example except that a commercially available acrylic copolymer was substituted for the block copolymer thereby forming a composition which has been disclosed in previous patents and publications. The low profile resin thus made was then formulated into a molding compound using the same procedures as in Example I. Specimens molded from this composition has a surface finish which was slightly poorer than the first five examples and the notched impact strength was only 10 foot pounds per inch and the unnotched was down to 15.4 foot pounds per inch. This example illustrates the dramatic effect of omitting the novel impact component.

EXAMPLE VII

Four hundred seventy-two grams of poly (dipropylene glycol fumarate-maleate) were thoroughly dispersed in 480 grams of styrene which is the commonly used diluent in thermosetting polyester compositions.

To the above dispersion, 80 grams of cellulose acetate butyrate were added in accordance with the prior art and the blending procedures described in Example I were followed. Specimens molded from this composition had an acceptably smooth surface but the notched impact strength was reduced to 12.0 foot pounds per inch and the unnotched value was only 16.0 foot pounds per square inch. This example when compared to Example IV demonstrates that the low profile surface additive alone does nothing to effect the impact strength of the molded composition.

EXAMPLE VIII

To provide a standard for this series of experiments, a commercially available glass reinforced thermosetting polyester sheet molding compound with the same glass fiber content and fiber length was molded into impact specimens and tested. This material was advertised as a low surface profile resin and it was believed to contain a poly (methyl-methacrylate) low surface profile additive. The surface indeed proved to be acceptable for most decorative applications but the notched impact strength was only 11 foot pounds per square inch and the unnotched impact strength was down to 16.0 pounds per square inch.

The deleterious effect of the low surface profile additive on the impact properties is apparent when the impact strengths of an article molded from a low profile resin are compared to the impact properties of the conventional glass filled polyester resin which has a notched impact strength of 15 foot pounds per square inch and an unnotched impact strength of 20 foot pounds per square inch.

From these examples, it is readily seen that the polyester molding composition herein disclosed has a surface finish superior to the conventional polyester system and has an impact resistance far above that of the recently developed low surface profile molded compositions.

While my invention has been described in terms of certain preferred embodiments, it will be appreciated that other forms thereof can readily be adapted by one skilled in the art. Therefore, the scope of my invention is not limited to these specific embodiments illustrated.

I claim:

1. A fiber reinforced molded article formed by heating under pressure a mixture comprising by weight:
   25 to 60 parts of an unsaturated polyester formed from a linear aliphatic alpha, beta-unsaturated dicarboxylic acid and/or anhydride having from four to six carbon atoms and a polyhydric alcohol, said polyester having an acid number of from 5 to 40; and
   5 to 20 parts of a polymer composition consisting of, by weight, 0 to 50 parts of a thermoplastic polymer having a glass transition temperature above 30° C. and 50 to 100 parts of an ABA type block copolymer having A and B segments with said A segments being repeating mer units of a material which if homopolymerized would produce a rigid thermoplastic polymer having a glass transition temperature above 30° C. and said B segments being repeating mer units of a material which if homopolymerized would produce a flexible elastomeric polymer having a glass transition temperature below 10° C.; and
   40 to 60 parts of a monomeric copolymerizable diluent selected from the group consisting of tertiary butyl styrene, and mixtures comprising at least 50% by volume tertiary butyl styrene and the balance of a said mixture being any of styrene, monochlorostyrene, or vinyl toluene, and
   50 to 100 parts of a fibrous reinforcement filler; and
   100 to 180 parts of a mineral filler, said polyester and said polymer composition being initially uniformly dispersed in said diluent.

2. A fiber reinforced molded article formed by heating under pressure a mixture comprising by weight:
   25 to 60 parts of an unsaturated polyester formed from a linear aliphatic alpha, beta-unsaturated dicarboxylic acid and/or anhydride having from four to six carbon atoms and a polyhydric alcohol, said polyester having an acid number of from 5 to 40; and
   5 to 20 parts of a polymer composition consisting by weight of 0 to 50 parts of a thermoplastic polymer having a glass transition temperature above 30° C.; and 50 parts to 100 parts of an ABA type block copolymer having A and B segments with said A segments being made up substantially of repeating styrene units and said B segments being made up substantially of either repeating butadiene or isoprene units, or randomly mixed ethylene and propylene units, said block copolymer having a B to A plus B weight ratio of 0.5 to 0.8; and
   40 to 60 parts of a monomeric copolymerizable diluent selected from the group consisting of tertiary butyl styrene, and mixtures of at least 50% by volume tertiary butyl styrene and the balance of a said mixture being any of styrene, or monochlorostyrene, or vinyl toluene, and
   50 to 100 parts of a fibrous reinforcement filler; and
   100 to 180 parts of a mineral filler, with said polyester and polymer compositions all being initially uniformly dispersed in said diluent.

3. A fiber filler polyester thermosetting moldable composition comprising by weight:
   1. 50 to 100 parts of a fibrous glass filler, and
   2. a uniform dispersion comprising by weight,
      a. 25 to 60 parts of an unsaturated polyester condensation product of a linear, aliphatic, alpha, beta-unsaturated dicarboxylic acid and/or anhydride having from four to six carbon atoms and a polyhydric alcohol, said condensation product having an acid number in the range of 5 to 40, and
      b. 5 parts to 20 parts of a polymer composition consisting of, by weight 0 to 50 parts of a rigid thermoplastic polymer having a glass transition temperature greater than 30° C., and 50 to 100 parts of an ABA type block copolymer having A and B segments, with said A segments being repeating mer units of a material, which if homopolymerized would produce a rigid thermoplastic polymer having a glass transition temperature above 30° C., and said B segments being repeating mer units of a material, which if homopolymerized would produce a flexible, elastomeric polymer having a glass transition temperature below 10° C., said block copolymer having a B to A plus B weight ratio ranging from 0.5 to 0.8 with (a) and (b) being completely dissolved in c. from 40 to 60 parts of a monomeric copolymerizable diluent selected from the group consisting of tertiary butyl styrene, and mixtures comprising at least 50% by volume tertiary butyl styrene and the balance of a said mixture being any of styrene, or monochlorostyrene, or vinyl toluene, and 3. 100 parts to 180 parts of a mineral filler.

4. A fiber filler polyester thermosetting moldable composition comprising by weight:

1. 50 to 100 parts of a fibrous glass filler, and
2. a dispersion comprising by weight,
   a. 25 to 60 parts of an unsaturated polyester condensation product of linear, aliphatic, alpha, beta-unsaturated dicarboxylic acid and/or anhydride having from four to six carbon atoms and a polyhydric alcohol, said condensation product having an acid number in the range of 5 to 40, and
   b. 5 parts to 20 parts of a polymer composition consisting by weight of 0 to 50 parts of a rigid thermoplastic polymer having a glass transition temperature greater than 30° C. and 50 parts to 100 parts of a three segment block copolymer having an ABA type molecular structure, with said A segments being polystyrene segments, and said B segments being made up substantially of either repeating butadiene or isoprene units, or randomly mixed ethylene and propylene units, said block copolymer having a B to A plus B weight ratio of 0.5 to 0.8 with (a) and (b) being uniformly dispersed in
   c. from 40 to 60 parts of a monomeric copolymerizable diluent selected from the group consisting of tertiary butyl styrene, and mixtures comprising at least 50% by volume tertiary butyl styrene and the balance of a said mixture being any of styrene, monochlorostyrene or vinyl toluene, and
3. 100 parts to 180 parts of a mineral filler.

* * * * *